(No Model.)

W. S. LISCOMB.
TEA KETTLE.

No. 278,569.  Patented May 29, 1883.

Attest:
Philip F. Larner
Howell Bartle

Inventor:
William S. Liscomb
By McWood
Attorney

UNITED STATES PATENT OFFICE.

WILLIAM S. LISCOMB, OF PROVIDENCE, RHODE ISLAND.

TEA-KETTLE.

SPECIFICATION forming part of Letters Patent No. 278,569, dated May 29, 1883.

Application filed February 3, 1883. (No model.)

*To all whom it may concern:*

Be it known that I, WILLIAM S. LISCOMB, of the city and county of Providence, in the State of Rhode Island, have invented certain new and useful Improvements in Tea-Kettles and Similar Utensils; and I do hereby declare that the following specification, taken in connection with the drawings furnished and forming a part thereof, is a full, clear, and complete description of my invention.

It is well known that in pouring hot liquids from a tea-kettle the rising column of hot steam from the spout thereof is liable to and does sometimes scald the hand or wrist of the person grasping the bail of the kettle.

The object of my invention is to obviate the contact of the rising column of steam from a tea-kettle spout, and to that end, instead of having the spout occupy a vertical plane coincident with the vertical plane of the bail, as heretofore, I curve or project it laterally to one side of the kettle from its junction therewith, thus causing a column of heat and steam rising therefrom to pass wholly to one side of the bail and free from contact with a hand grasping the bail.

To more particularly describe my invention, I will refer to the accompanying drawings, in which—

Figure 1:
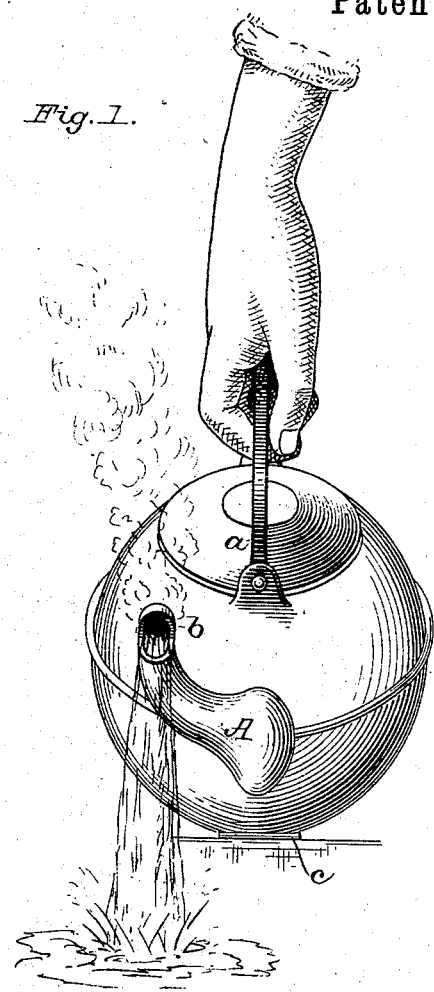
Figure 2:
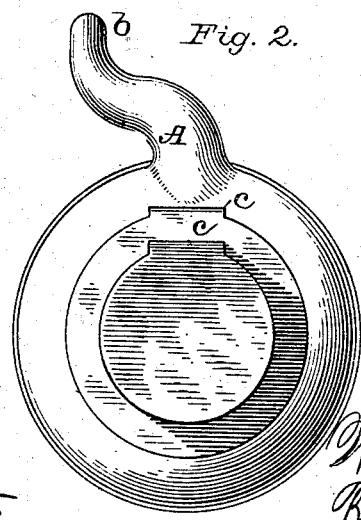

Figure 1 is a front view of my improved tea-kettle tilted forward by its bail, as in use, and discharging hot water through its spout while resting on its front straight edge bearing upon a stove-top. Fig. 2 is a bottom view of said kettle.

The spout A, as is usual with tea-kettles, has its base or junction with the kettle located in the vertical plane occupied by the bail $a$ when the latter is raised and grasped by the hand; but it will be seen that said spout projects laterally, so that the main portion thereof, with the nose $b$, occupies a vertical plane sufficiently to one side of the bail, and of a hand when grasping the same, to obviate all liability of scalding the hand by the contact therewith of the column of heat and steam rising from the nose of the spout during the discharge of hot water therefrom. It will be obvious that the spout may be straight instead of curved to one side, as shown, if the base thereof be located to one side or the other of the vertical plane occupied by the bail, so that it would in like manner prevent the scalding of the hand, and while I do not exclude myself from that variation in construction, I prefer the laterally-curved spout, because the entire contents of the kettle can then be as readily discharged as from the tea-kettles of the usual construction. The rocking of the kettle is prevented when tilted upon its bearing-edge, as has heretofore been done, by means of the straight-edge bearing $c$.

Having thus described my invention, I claim as new and desire to secure by Letters Patent—

A tea-kettle provided with a spout having its nose located at one side of the vertical plane occupied by the bail of the kettle, substantially as described, whereby a column of heat and steam rising from the spout while discharging the contents of the kettle is prevented from contact with the hand grasping the bail, as set forth.

WM. S. LISCOMB.

Witnesses:
PHILIP F. LARNER,
HOWELL BARTLE.